UNITED STATES PATENT OFFICE.

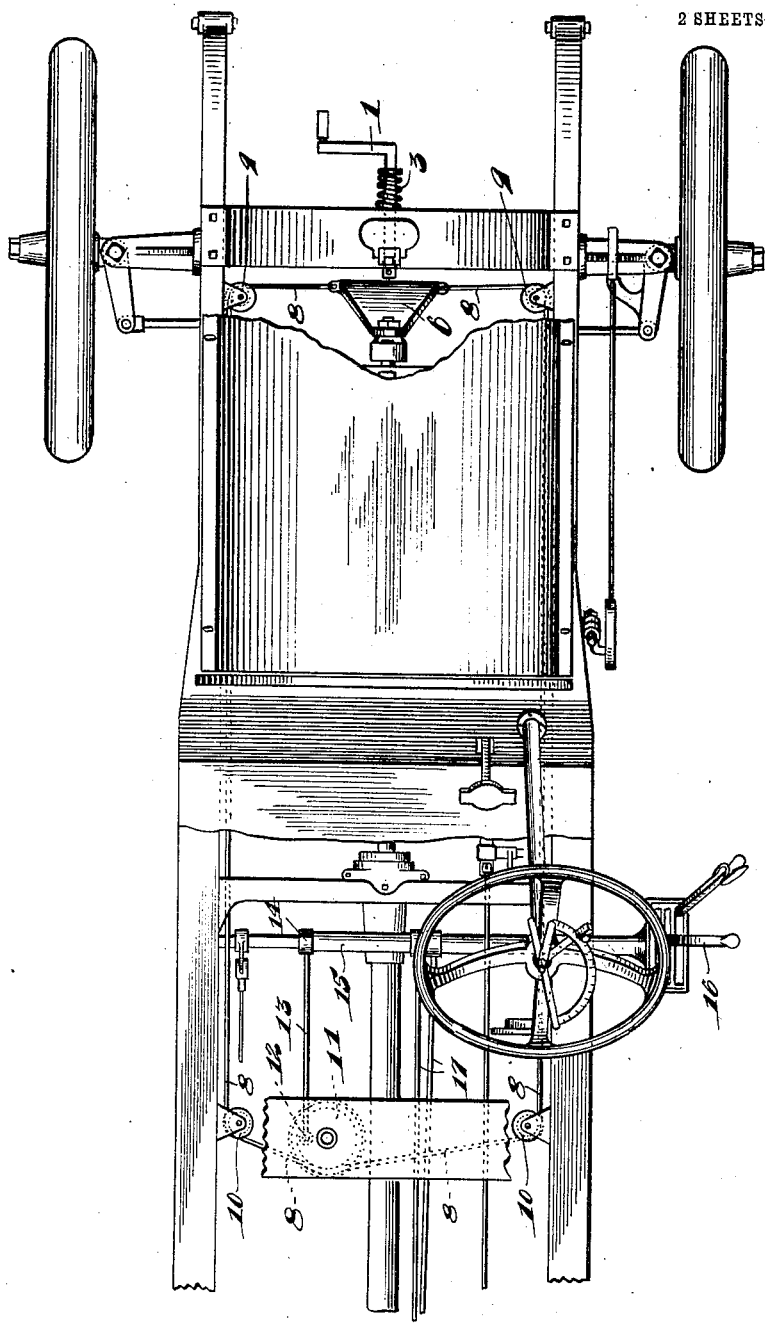

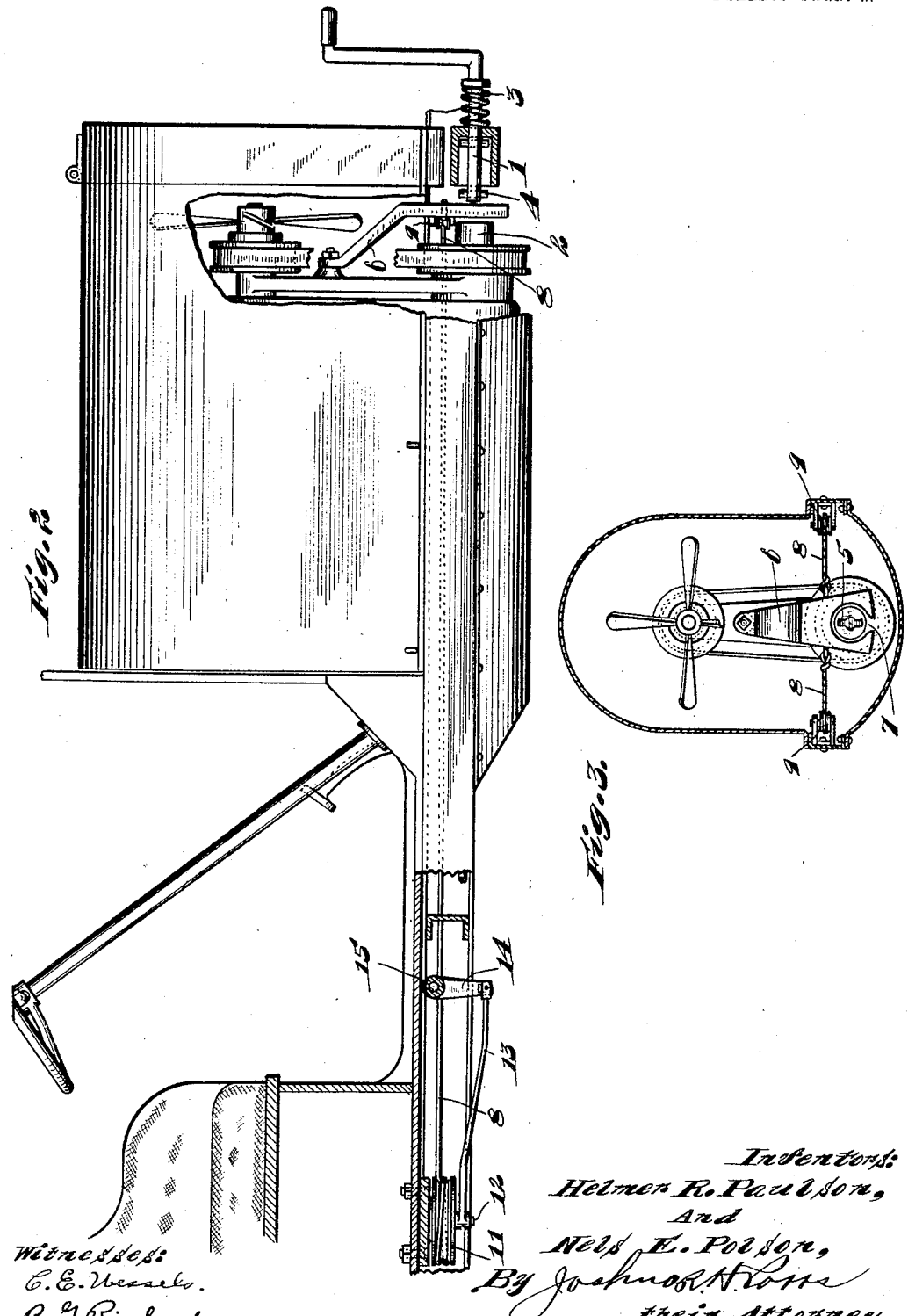

NELS E. POLSON AND HELMER R. PAULSON, OF LA GRANGE, ILLINOIS.

SAFETY ATTACHMENT FOR AUTOMOBILES.

1,112,551.   Specification of Letters Patent.   Patented Oct. 6, 1914.

Application filed September 20, 1913.  Serial No. 790,946.

*To all whom it may concern:*

Be it known that we, NELS E. POLSON, a former subject of the King of Sweden, who have declared my intention of becoming a citizen of the United States, and HELMER R. PAULSON, a citizen of the United States, and residents of the city of La Grange, county of Cook, and State of Illinois, have invented certain new and useful Improvements in Safety Attachments for Automobiles, of which the following is a specification.

Our invention relates to improvements in safety appliances for automobiles and has for its object the provision of means for preventing starting of the automobile upon starting of the engine which is of simple construction and efficient in operation.

The invention consists in the combinations and arrangements of parts hereinafter described and claimed.

The invention will be best understood by reference to the accompanying drawings forming a part of this specification, and in which—

Figure 1 is a partial top plan view of an automobile equipped with a safety appliance embodying our invention, Fig. 2, a partial side view of the same, and Fig. 3, a sectional view showing a guard plate, employed in the construction, in elevation.

The preferred form of construction as illustrated in the drawings comprises the usual crank 1 adapted to engage the usual motor shaft 2 upon rearward movement of said crank for starting the engine in the usual manner, said crank being normally held in its forward position by means of a spring 3 and being provided with a pin 4 on its rearward end adapted to engage the socket 5 in the end of motor shaft 2 in the usual manner as will be readily understood by those skilled in the art. It will be observed that spring 3 normally holds crank 1 in forward position out of engagement with motor shaft 2 so as to leave a space between said crank and said motor shaft. A plate 6 is pivoted to swing in the space between crank 1 and shaft 2, said plate being provided with an opening 7 which is adapted to permit the passage of crank 1 for engagement with motor shaft 2 when said plate is in its central position with opening 7 registering with said crank as will be readily understood. Cables 8 attached to opposite sides of plate 6, are passed over suitable guide rollers 9 and 10 and are wrapped upon a drum 11 mounted on the frame of the automobile. Drum 11 carries a crank pin 12 which is connected by means of a link 13 with a crank arm 14 secured to a sleeve 15 as indicated. Sleeve 15 is operatively connected with the ordinary gear shifting lever 16 of the automobile, said sleeve being also connected by links 17 with the gearing of the automobile in the usual manner. The connection between sleeve 15 and drum 11 is such that when lever 16 is in "neutral position" and the driving gears of the automobile are out of mesh, opening 7 in plate 6 is in registration with crank 1 so as to permit engagement of said crank with motor shaft 2 and the starting of the engine. It will be observed however that upon shifting of lever 16 in either direction to place the gears of the automobile in mesh, plate 6 will be swung to one side or the other, thus swinging the solid portion of said plate between the rear end of crank 1 and the forward end of motor shaft 2 to prevent operative engagement between said crank and motor shaft, thus positively preventing starting of the engine while the driving gears of the automobile are in mesh. Thus, it will be observed, it is impossible to start the automobile while the engine is operatively connected with the driving mechanism thereof, so that accidents due to careless starting of the engine when in operative connection with the driving mechanism of the automobile will be avoided. The specific arrangement of parts disclosed is a simple and efficient one for the purpose.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention what we claim as new and desire to secure by Letters Patent is:

1. The combination of a motor propelled vehicle having a motor and a crank for starting the same; means for preventing operative connection between said crank and motor; a gear shifting lever; a drum; cables wound upon said drum and operatively connected with the means for preventing operative connection between said crank and motor; a crank pin on said drum; a crank arm operated by said lever; and a link connecting said crank pin and said crank arm, substantially as described.

2. The combination of a motor propelled vehicle having a motor and a crank spring held from operative connection with said motor; a swinging plate interposed between said crank and motor, said plate having an opening registering with said crank and adapted to permit engagement of said crank with said motor; a gear shifting lever; a drum; cables attached to opposite sides of said plate and wound upon said drum; a crank pin on said drum; a crank arm operated by said lever; and a link connecting said crank pin and said crank arm, substantially as described.

In testimony whereof we have signed our names to this specification in the presence of two subscribing witnesses.

NELS E. POLSON.
HELMER R. PAULSON.

Witnesses:
    JOSHUA R. H. POTTS,
    HELEN F. LILLIS.

Copies of this patent may be obtained for five cents each, by addressing the "Commissioner of Patents, Washington, D. C."